United States Patent [19]
Kidston et al.

[11] Patent Number: 5,615,933
[45] Date of Patent: Apr. 1, 1997

[54] ELECTRIC VEHICLE WITH REGENERATIVE AND ANTI-LOCK BRAKING

[75] Inventors: Kevin S. Kidston, New Hudson; Brendan M. Conlon, Royal Oak, both of Mich.

[73] Assignee: General Motors Corporation, Detroit, Mich.

[21] Appl. No.: 456,094

[22] Filed: May 31, 1995

[51] Int. Cl.$^6$ ................................................ B60T 13/74
[52] U.S. Cl. ............................ 303/152; 303/3; 188/156; 180/65.1
[58] Field of Search ............................ 303/3, 15, 152; 364/426.02; 180/65.1, 265, 65.5, 65.3, 65.4; 318/364, 371; 188/156, 158, 159

[56] References Cited

U.S. PATENT DOCUMENTS

| | | | |
|---|---|---|---|
| Re. 33,633 | 8/1991 | Kade et al. | 364/426.02 |
| 4,850,650 | 7/1989 | Eckert et al. | 303/9.62 |
| 5,000,297 | 3/1991 | Shaw et al. | 188/156 |
| 5,024,299 | 6/1991 | Shaw et al. | 188/156 |
| 5,099,186 | 3/1992 | Rippel et al. | 318/803 |
| 5,219,049 | 6/1993 | Unterborn | 188/156 |
| 5,246,283 | 9/1993 | Shaw et al. | 303/115.2 |
| 5,281,009 | 1/1994 | Kidston et al. | 364/426.02 |
| 5,310,026 | 5/1994 | Shaw et al. | 188/156 |
| 5,472,265 | 12/1995 | Ohnuma | 303/3 |

FOREIGN PATENT DOCUMENTS

| | | | |
|---|---|---|---|
| 2444738 | 4/1976 | Germany | 303/3 |

*Primary Examiner*—Peter M. Poon
*Attorney, Agent, or Firm*—Robert M. Sigler

[57] ABSTRACT

A vehicle has an electric propulsion motor, a regenerative brake control and an anti-lock friction brake system which responds to excess wheel slip of a front wheel during braking to modulate friction braking torque to reduce the excess wheel slip. It further has a control responsive to activation of the anti-lock brake system to prevent the application of regenerative braking during such activation. The regenerative braking may be blended with the friction braking when anti-lock braking is not activated so that battery charge is conserved. When the anti-lock braking is activated, however, the regenerative braking is ramped down to preserve smoothness in the braking. The regenerative braking may be applied to create drag during vehicle coastdown. When anti-lock braking is activated, if it is sensed that the wheel is on a low friction (μ) surface, the regenerative braking is removed immediately. The low friction surface may be identified from the brake fluid pressure levels during the modulation process of the anti-lock brake system. The coastdown drag may be applied at more than one operator controlled level or, when cruise control is active, automatically at a higher level for more accurate vehicle speed control on downgrades.

16 Claims, 9 Drawing Sheets

ELECTRIC VEHICLE WITH REGENERATIVE AND ANTI-LOCK BRAKING

BACKGROUND OF THE INVENTION

The technical field of this invention is electric vehicles which use regenerative braking and which further have anti-lock friction brake systems. Such vehicles may be provided with a brake system capable of blending regenerative and friction braking at the front wheels so as to conserve battery charge. Such vehicles may be provided, either in addition or alternatively, with coastdown regenerative braking to simulate the "feel" of an internal combustion engine driven vehicle when coasting with no accelerator pedal depression.

However, if such vehicles are equipped with anti-lock brake controls, certain inconsistencies in the regenerative and anti-lock brake controls may become apparent. An anti-lock brake control modulates brake fluid pressure in a friction brake system so as to try to maintain wheel slip close to, but not past, the critical slip value of the road surface in contact with the wheel. Typical anti-lock brake systems are capable of such modulation at the rate of 3 to 10 Hz; but a regenerative brake control is incapable of varying its braking force anywhere near that frequency. In addition, if the driven wheels of an electric vehicle lose traction and lock up on a low friction (p) surface due to the application of regenerative braking, the large inertia of the propulsion motor works against the wheel attempting to spin back up to speed, even when braking pressure is released.

SUMMARY OF THE INVENTION

The vehicle of this invention has a front wheel and an electric propulsion motor connected thereto, a regenerative brake control for applying regenerative braking to the front wheel and an anti-lock friction brake system which responds to excess wheel slip of the front wheel during braking to modulate friction braking torque to reduce the excess wheel slip. It further has a control responsive to activation of the anti-lock brake system to prevent the application of regenerative braking during such activation.

In one embodiment of the invention, the regenerative braking is blended with the friction braking when anti-lock braking is not activated so that battery charge is conserved. When the anti-lock braking is activated, however, the regenerative braking is removed and full braking of the front wheel is handled by the friction braking system under anti-lock braking control. Preferably, the regenerative braking is not immediately removed but is ramped down to preserve smoothness in the braking.

In another embodiment of the invention, the regenerative braking is applied to create drag during vehicle coastdown. When anti-lock braking is activated, if it is sensed that the wheel is on a low friction (μ) surface, all regenerative braking, including that used to create drag, is removed immediately. The low friction surface may be identified from the brake fluid pressure levels during the modulation process of the anti-lock brake system.

DESCRIPTION OF A PREFERRED EMBODIMENT

Figure 1:
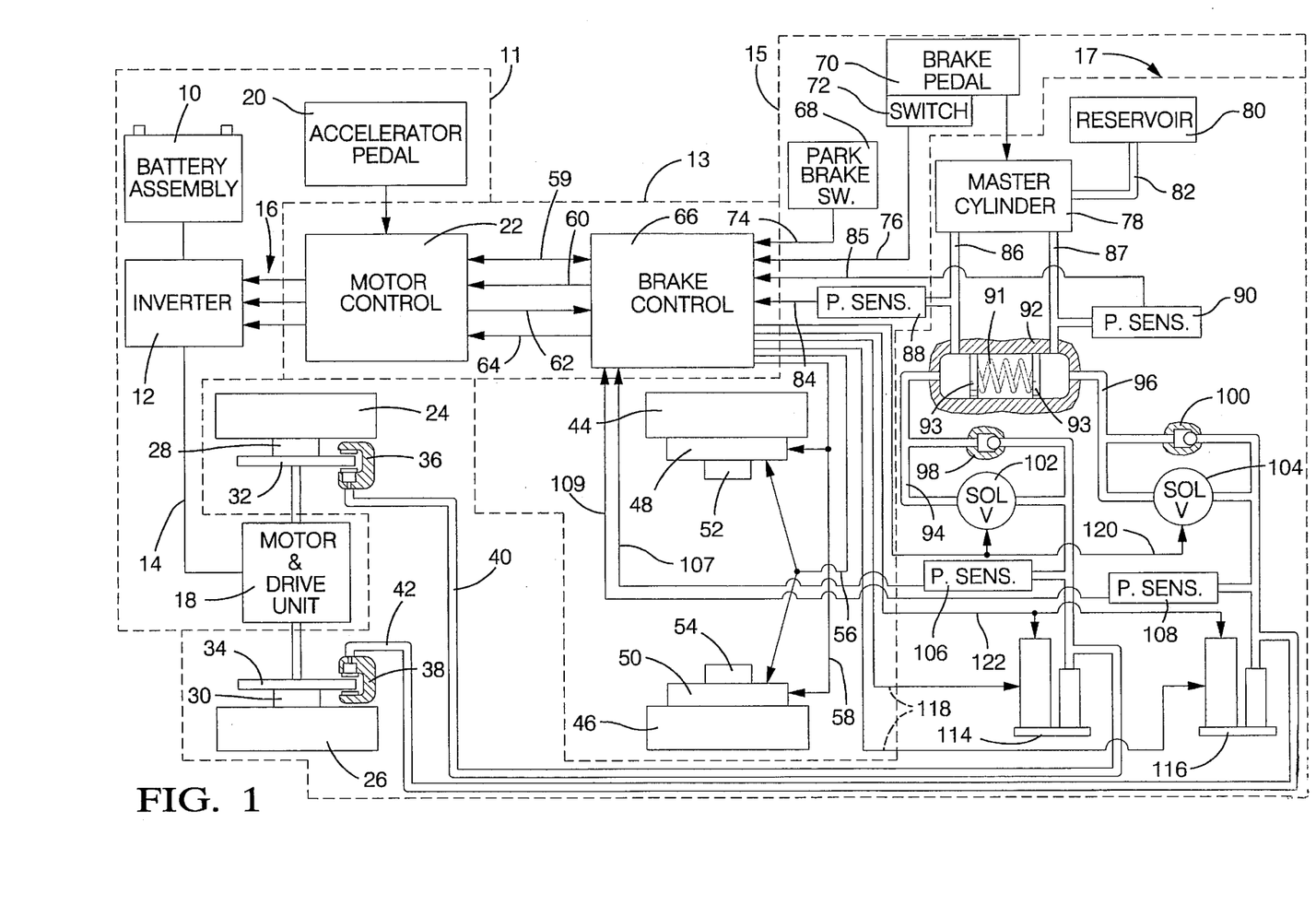
FIG. 1 is a schematic diagram of an electric vehicle according to this invention.

Referring to FIG. 1, an electric vehicle according to this invention comprises an electric motor propulsion system 11, a brake system 15 and a control unit 13. Electric motor propulsion system 11 includes a battery pack 10, an inverter 12 (for use with AC motors), an accelerator pedal 20 and an electric motor and drive train 18. Brake system 15 includes a brake pedal 70, a hydraulic braking system 17 and electric drum brakes 48 and 50. Control unit 13 includes a motor control 22 for controlling propulsion system 11 and a brake control 66 for controlling brake system 15.

In propulsion system 11, battery pack 10 supplies power to the vehicle systems; and power inverter 12 responds to motor control 22 in controlling electric motor 18. Motor 18 provides drive force to vehicle drive wheels 24 and 26; further provides regenerative braking, when commanded, by generating power and coupling the generated power to battery pack 10, thereby providing braking torque to wheels 24 and 26. An example motor drive and recharge system, suitable for use as inverter 12 and motor 18 (assuming a three phase AC motor 18 is used), is set forth in U.S. Pat. No. 5,099,186, assigned to the assignee of this invention and having a disclosure that is incorporated herein by reference. Accelerator pedal 20 provides an accelerator command to motor control 22, which responsively controls inverter 12 via command line 16 to provide power to motor 18 and thereby provide motive drive force to drive wheels 24 and 26.

In brake system 15, hydraulic brake system 17 comprises master cylinder 78, hydraulic lines 40, 42, 86, 87, 94 and 96, accumulator 92, actuators 114 and 116, solenoid valves 102 and 104, brake calipers 36 and 38 and brake discs 32 and 34. Responding to operator depression of brake pedal 70, brake control 66 provides brake information to motor control 22 and controls hydraulic brake system 17, including solenoid valves 102 and 104, actuators 114 and 116, and electric rear brakes 48 and 50. Bypass valves 98 and 100 allow excess pressure from actuators 114 and 116 to flow to accumulator 92. Brake control 66 also monitors the rotational speeds of vehicle wheels 24, 26, 44 and 46 through speed sensors 28, 30, 52 and 54.

Battery pack 10 can be any battery pack or rechargeable electric power storage device suitable for use in an electric vehicle. Power inverter 12 is used when motor 18 is one or more AC motors. If one or more DC drive motors are used, power inverter 12 is not necessary and may be replaced with an appropriate DC motor control of a type well known to those skilled in the art.

Motor drive unit 18 may be a single drive motor driving both wheels 24 and 26, may be two motors connected back-to-back driving wheels 24 and 26, or may be two or more motors with a motor incorporated into each wheel assembly. Additionally, the motors may be AC motors or DC motors, including one or more brushless DC motors. The drive train preferably comprises a reduction gear set coupled to the motor output shaft and driving the vehicle drive wheels. No clutches are necessary in the drive train, as adequate performance has been achieved without the necessity of a gear shifting transmission and since, to reverse the vehicle, the motor direction may simply be reversed. Reduction gearsets of the type suitable for use in the drive train are well known to those skilled in the art.

Motor control 22 may be any microcomputer based control suitable for providing control commands to the type of motor used. Accelerator pedal 20 responds to operator foot commands in a conventional manner, providing output signals through an actuator for converting pedal position to an electric signal. Preferably, the actuator comprises redundant potentiometers that provide two or more pedal position signals to motor control 22. This type of accelerator pedal may be easily implemented by those skilled in the art.

Brake control 66 may be any microprocessor based control suitable for providing output commands to actuators 114 and 116, rear brakes 48 and 50 and valves 102 and 104 and for receiving input signals from the parking brake switch 68, brake pedal switch 72 and pressure transducers 88, 90, 106 and 108.

Brake pedal 70 may be a conventional brake pedal, and switch 72 may be a conventional brake pedal switch of a known type commonly used to turn on rear brake lights (not shown). Master cylinder 78 is a conventional master cylinder with a reservoir 80 connected by hydraulic line 82. Accumulator 92 has expansion chambers on each side allowing accumulation of hydraulic fluid by compression of center spring 91 between two pistons 93. Pressure transducers 88 and 90 may be any suitable type of transducers for providing signals indicative of the pressure in brake lines 86 and 87. Valves 102 and 104 are solenoid valves normally opened but activatable to a closed position to isolate hydraulic lines 94 and 96 from lines 40 and 42, respectively, when a command is received through command line 120.

Actuators 114 and 116 may be existing anti-lock brake actuators with the requirement that the actuators be capable to independently provide pressure in hydraulic lines 40 and 42 responsive to commands on line 118. Actuators 114 and 116 are of the type set forth in U.S. Pat. Nos. 4,850,650 and Re. 33,663, both assigned to the assignee of this invention and both having disclosures that are incorporated herein by reference.

Brake calipers 36 and 38 are conventional hydraulic disc brake calipers for use with conventional brake discs 32 and 34. An example of the front brake system is set forth in U.S. patent application Ser. No. 07/942,015, filed Sep. 8, 1992, now U.S. Pat. No. 5,246,283, assigned to the assignee of this invention, and having a disclosure that is incorporated herein by reference.

Electric brakes 48 and 50 for rear wheels 44 and 46 may be any suitable electric brake. Example electric drum brakes are set forth in U.S. Pat. Nos. 5,000,297 and 5,024,299, both assigned to the assignee of this invention and each having a disclosure that is incorporated herein by reference. Examples of electric drum brakes are also set forth in U.S. patent application Ser. No. 07/963,179, filed Oct. 19, 1992, now U.S. Pat. No. 5,310,026, and Ser. No. 07/720,087, filed Jan. 24, 1991, now U.S. Pat. No. 5,219,049, both assigned to the assignee of this invention and each having a disclosure that is incorporated herein by reference.

Speed sensors 28, 30, 52 and 54 are well known to those skilled in the art and may be of the type commonly used in anti-lock brake systems. Motor control 22 may further comprise an electronic cruise control system which receives a vehicle speed signal therefor from a standard vehicle speed sensor, which is part of motor and drive unit 18. Motor control 22 may further be provided with an operator controlled coastdown drag switch, not shown, providing two levels of coastdown drag for optional simulation of internal combustion engine and/or air resistance.

Motor control 22 and brake control 66 communicate with each other over a serial data link 59, and three other dedicated communication lines 60, 62 and 64. Line 60 carries a PWM signal from brake control 66 to motor control 22; line 62 carries a PWM signal from motor control 22 to brake control 66; and line 64 carries a single bit signal from brake control 66 to motor control 22. Lines 60–64 provide fast communication between motor control 22 and brake control 66 for cooperative brake control.

Figure 2:
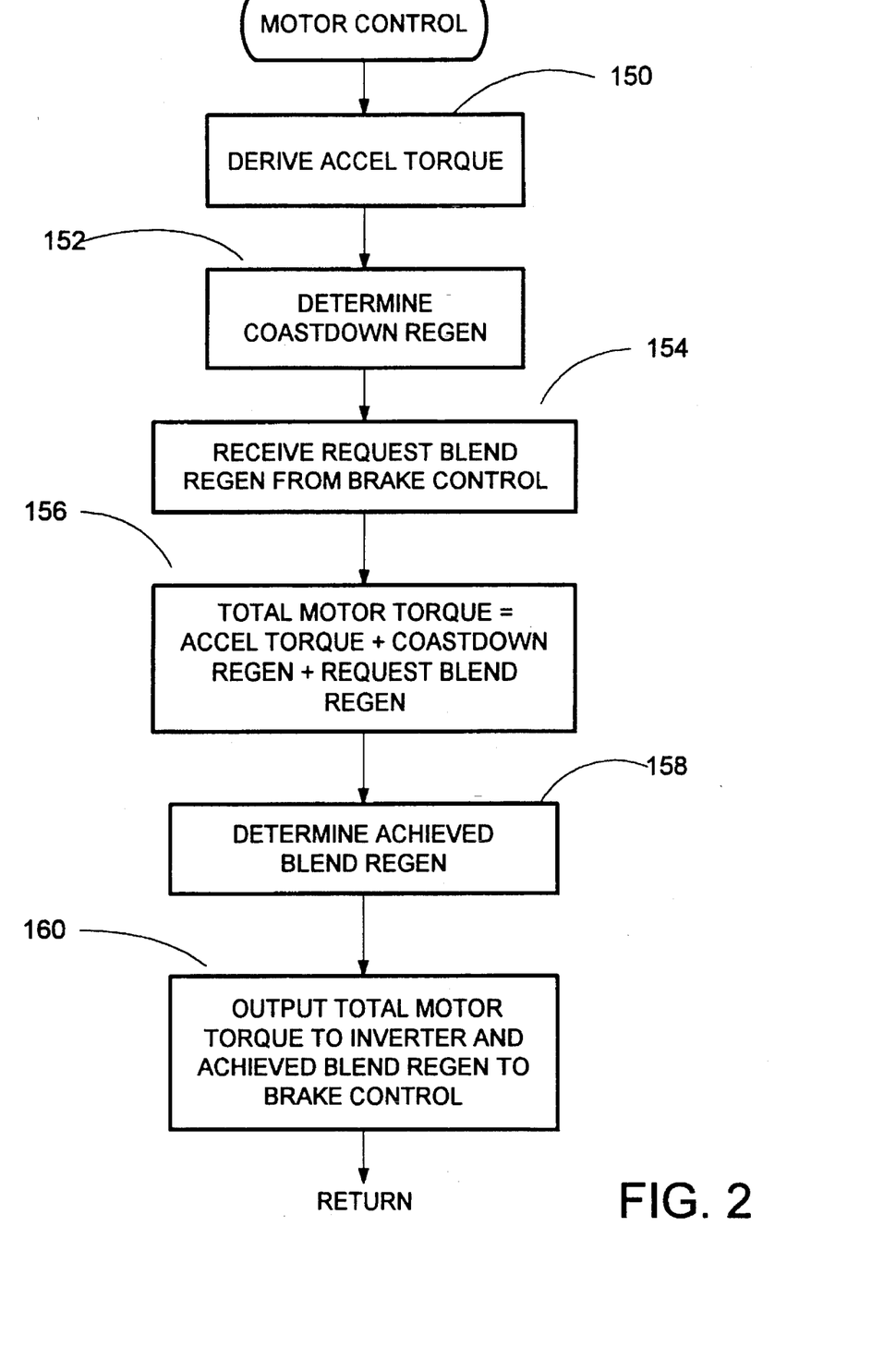
FIG. 2 is a flow chart describing the operation of the motor control of FIG. 1 relevant to this invention.

FIG. 2 describes, in flow chart form, a portion of a MOTOR CONTROL program run by motor control 22. Accelerator pedal 20 provides a signal to motor control 22 representing the latest position of accelerator pedal 20; and, from this signal, motor control 22 derives <150> a commanded accelerator torque, ACCEL TORQUE, which is stored in RAM. This positive value represents the input command of the vehicle operator for positive axle torque and may be derived by mathematical calculation or a table lookup from the accelerator 20 input signal. Next, a COASTDOWN REGEN torque is determined <152>. This is a negative value of axle torque which provides a drag simulating the engine braking and/or air resistance encountered by a vehicle with an internal combustion engine. This determination is performed in a subroutine DETERMINE COASTDOWN REGEN, which will be described in detail with reference to FIG. 3. Next, a commanded REQUEST BLEND REGEN torque signal is received <154> from brake control 66 on dedicated PWM communication line 60. This signal represents a request by brake control 66, when braking is required, that a particular amount of the braking torque be generated regeneratively in motor and drive unit 18 to save battery charge. Its derivation in brake control 66 will be described in more detail along with the rest of brake control 66 with reference to FIG. 5.

Next, the TOTAL MOTOR TORQUE is derived <156>. This is the total or net torque to be applied to the front wheels by motor and drive unit 18 and is calculated by adding the positive operator commanded ACCEL TORQUE, the negative COASTDOWN REGEN and the negative REQUEST BLEND REGEN, as well as any other individual torque inputs. Motor control 22 combines all commanded motor torque inputs into the single TOTAL MOTOR TORQUE signal so that motor and drive unit 18 is operating, at any moment, either in an accelerating or a braking mode. The TOTAL MOTOR TORQUE signal may be positive, in which case accelerating torque is to be applied to the front wheels. This case has little relevance to this description and will not be discussed further, except to state that a positive torque command will be issued through inverter 12 to motor & drive unit 18. However, if the TOTAL MOTOR TORQUE signal is negative, it represents a regenerative braking torque to be applied to the front wheels by motor and drive unit 18.

If the TOTAL MOTOR TORQUE is a braking torque, regenerative braking is blended with friction braking as much as possible to conserve battery charge, since regenerative braking restores some of the braking energy to battery pack 10. However, there are limits on the capability of the system to absorb the electrical energy produced in regenerative braking at any given moment. Motor control 22 thus next determines the ACHIEVED BLEND REGEN, that is, how much of the REQUEST BLEND REGEN requested by brake control 66 will actually be applied to motor and control unit 18. This is determined with reference to several monitored parameters of the vehicle and will be discussed in more detail in the subroutine DETERMINE ACHIEVED BLEND REGEN <158>, which is described in detail with reference to FIG. 4. The TOTAL MOTOR TORQUE signal is output to inverter 160 for the control of motor and drive unit 18; and the ACHIEVED BLEND REGEN torque signal is output to brake control 66 <160> over dedicated PWM communication line 62 so that brake control 66 may update its application of friction braking in view of the possible difference between its REQUEST BLEND REGEN and the motor control derived ACHIEVED BLEND REGEN. The MOTOR CONTROL routine is then exited.

Figure 11:
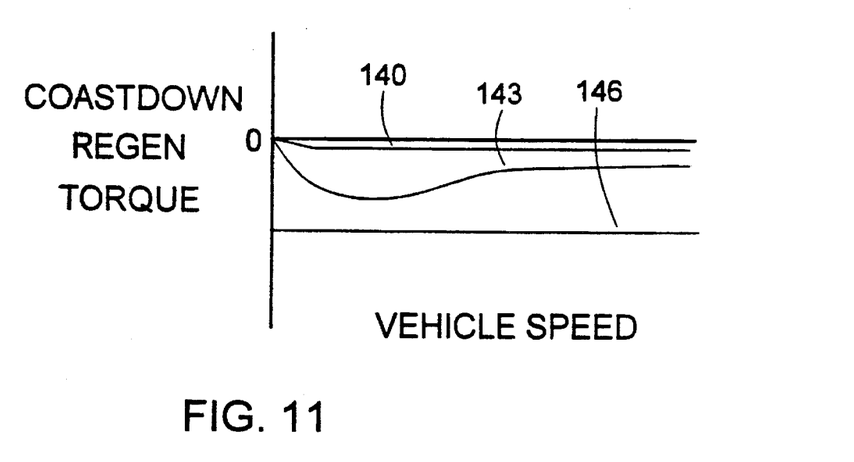

Subroutine DETERMINE COASTDOWN REGEN, called from the MOTOR CONTROL program of FIG. 2, is described with reference to FIG. 3. COASTDOWN REGEN is a negative torque to be produced by motor and drive unit 18 when the vehicle is coasting (no positive torque is commanded by the vehicle operator), or to reduce a positive torque which is commanded by the vehicle operator (or cruise control). Its primary purpose is to provide a driving "feel" to the vehicle operator which is similar to that of a vehicle with an internal combustion engine. Since not all operators may want this to the same degree, a choice of levels may be provided. This embodiment provides two such levels. The high level provides vehicle performance or "feel" similar to that of in internal combustion engine driven vehicle with an automatic transmission in DRIVE. When the vehicle is coasting, a definite engine braking effect will be produced. The low level provides very little, if any engine braking, more similar to that of an internal combustion engine vehicle with an automatic transmission in OVERDRIVE. The high and low coastdown modes each provide negative torque proportional to vehicle speed up to a predetermined vehicle speed and then provide a constant negative torque at higher vehicle speeds, as shown in the graphs of FIG. 11, in which curve 140 represents the low level lookup table of COASTDOWN REGEN torque and curve 143 represents the high level lookup table of COASTDOWN REGEN torque, each as a function of vehicle speed.

Figure 3:
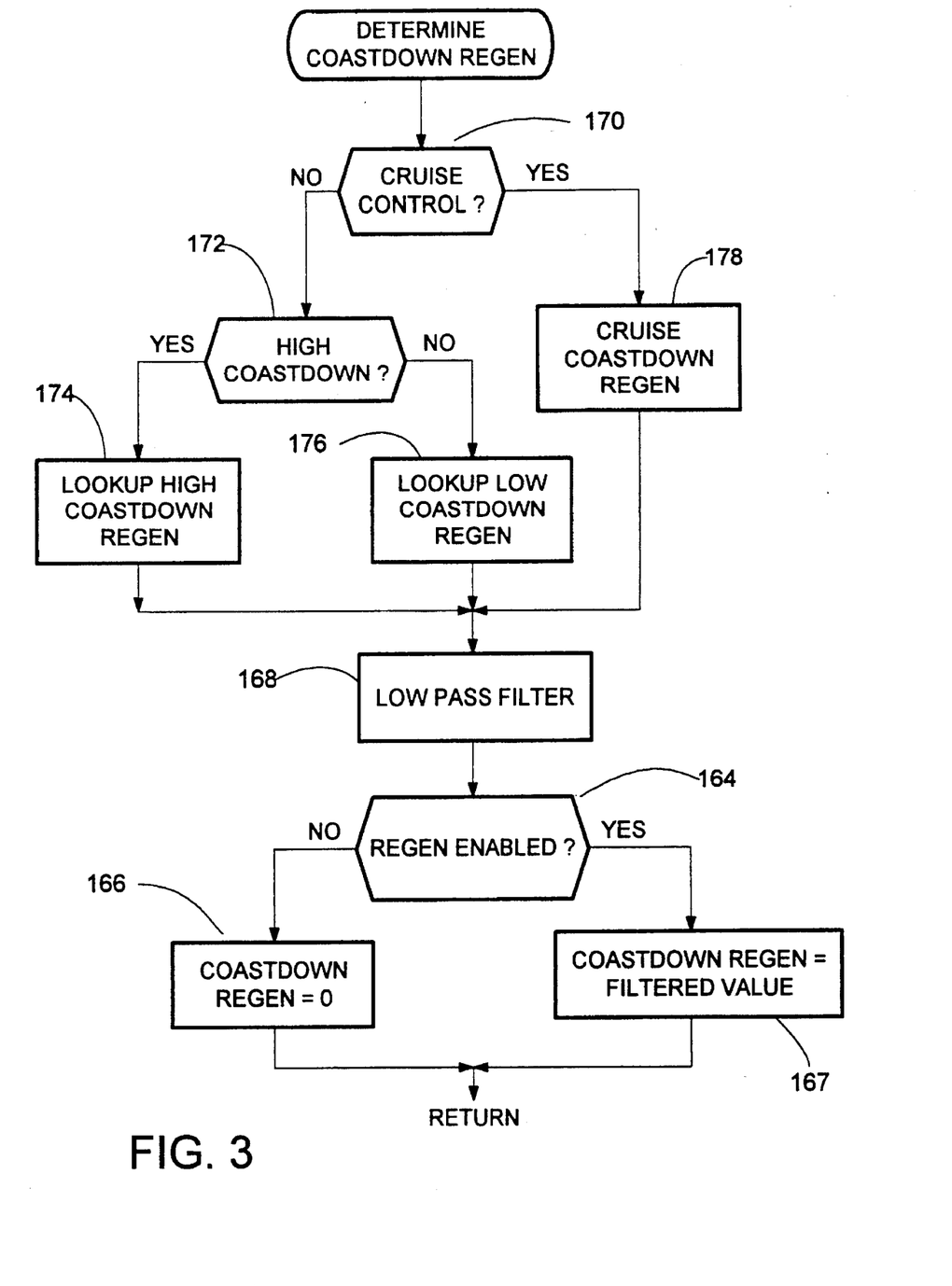
FIGS. 3 and 4 are subroutines called by the motor control of FIG. 2.

Referring to FIG. 3, subroutine DETERMINE COASTDOWN REGEN first checks a cruise status flag <170> to see if cruise control is active. If not, a high/low coastdown flag is checked <172> to see if high coastdown is enabled. If so, a table lookup on vehicle speed is performed <174> in the high coastdown table, which contains selected values from curve 143 (FIG. 11), to set the current value of COASTDOWN REGEN. If the high/low coast status flag indicates that low coastdown is enabled, the table lookup is performed <176> in the low coastdown table, which contains selected values from curve 140 (FIG. 11).

If cruise control is active <170>, COASTDOWN REGEN is derived differently. The regenerative braking capabilities of motor and drive unit 18 provide the possibility of better downhill cruise control operation than that obtained from an internal combustion engine, which is particularly useful for a vehicle designed with minimum friction and air drag for maximum battery charge conservation. A constant, higher value of COASTDOWN REGEN is applied when cruise control is active, as shown in curve 146 of FIG. 11. This provides greater vehicle drag, through regenerative braking, to hold vehicle speed more accurately on downgrades.

Once COASTDOWN REGEN is derived, it is provided to a LOW PASS FILTER <168>. Next, an enable regen status flag is checked to see if regenerative braking, including coastdown regen, is enabled <164>, since, as will be described with reference to FIG. 7, all regen is disabled when ABS is active and at least one of the front wheels is on a low friction surface. This status flag is controlled by brake control 66 and communicated to motor control 22 from brake control 66 over dedicated communication line 64. If not, the current value of COASTDOWN REGEN is set to zero <166>and the subroutine is exited. If coastdown regen is enabled, the filtered value from LOW PASS FILTER <168> is used.

Figure 4:
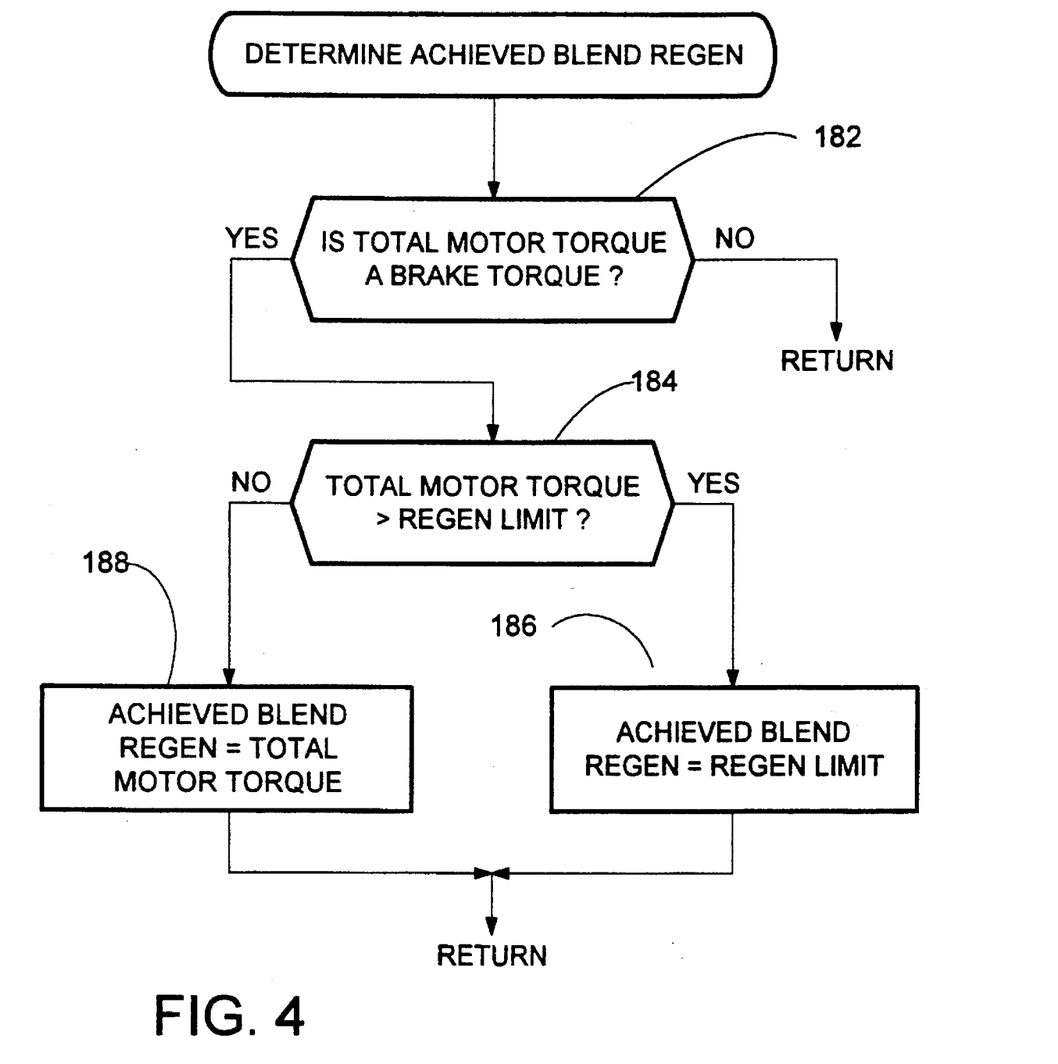

Subroutine DETERMINE ACHIEVED BLEND REGEN is described with reference to FIG. 4. In this subroutine, motor control 22 determines how much of the TOTAL MOTOR TORQUE, if it is a braking torque, is to be obtained by regenerative braking. First, the sign of TOTAL TORQUE is checked <182> to see if it is a braking torque. If not, there is no need to perform this function; and the subroutine is exited. However, if it is, the magnitude of TOTAL MOTOR TORQUE is compared to a regenerative torque limit, REGEN LIMIT <184>. This limit is derived and periodically updated in response to several sensed vehicle parameters which affect the capability of the system to absorb the electrical energy generated in regenerative braking, such as the state of charge of battery assembly 10, vehicle speed and/or other factors. Referring to FIG. 4, if TOTAL MOTOR TORQUE exceeds the REGEN LIMIT, ACHIEVED BLEND REGEN is limited to REGEN LIMIT <186. If it is equal or less, then the entire TOTAL TORQUE is provided as BLEND REGEN <188.

Figure 5:
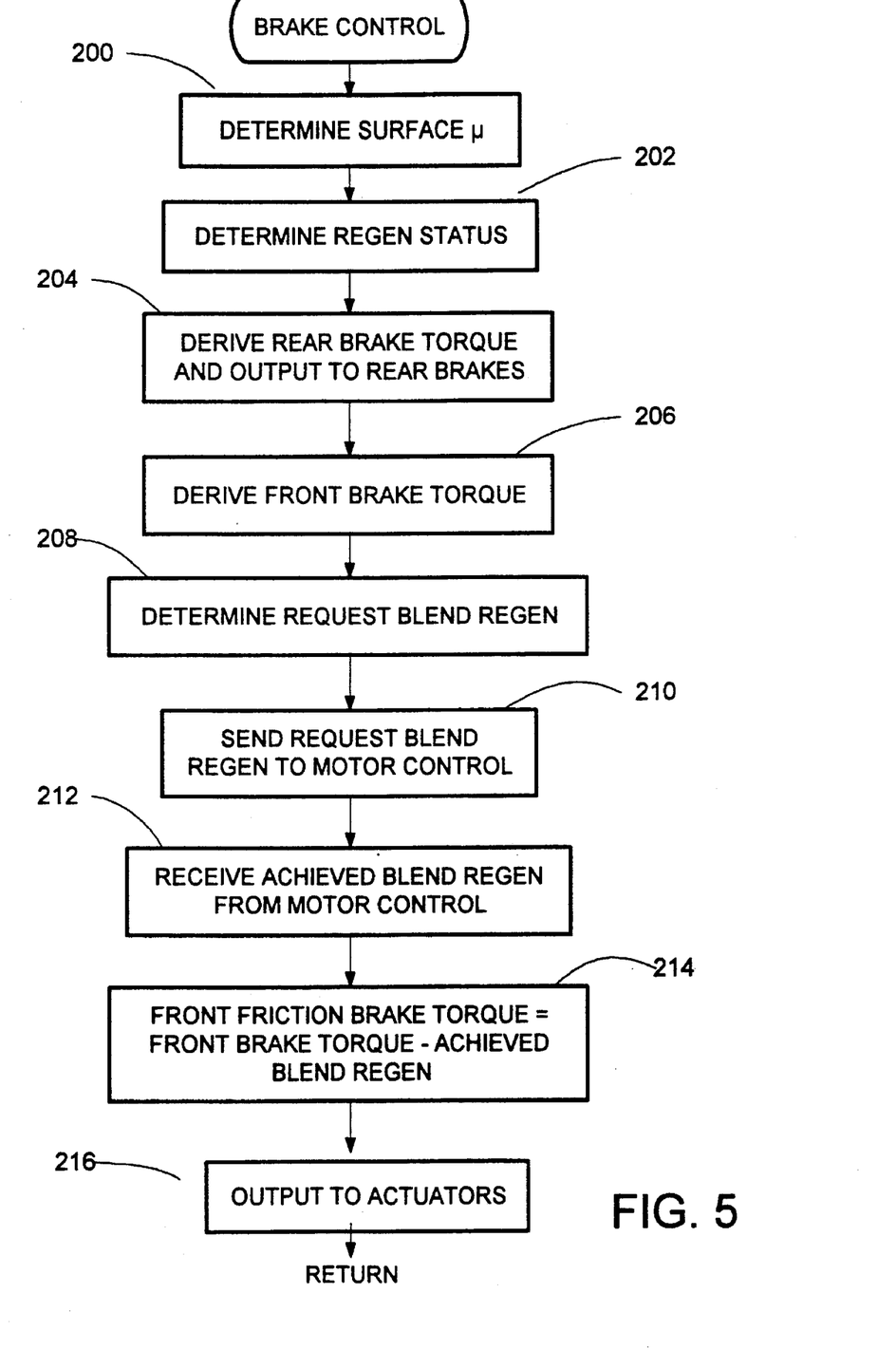
FIG. 5 is a flow chart describing the operation of the brake control of FIG. 1 relevant to this invention.

The program BRAKE CONTROL, which describes the main relevant portion of the operation of brake control 66, is described with reference to the flow chart of FIG. 5. The program first runs a subroutine DETERMINE SURFACE μ<200>, which determines whether either of the front wheels is operating, with ABS active, on a low friction (μ) surface (μ is the coefficient of friction between a vehicle wheel or tire and the road surface, a number which changes with wheel slip as well as with materials and surface conditions, as is well known in the field of anti-lock braking.). This subroutine will be described in more detail with reference to the flow chart of FIG. 6. The program next runs a subroutine DETERMINE REGEN STATUS <202>, which controls the blend regen ramp down status flag and the enable regen status flag to control the operation of blend and coastdown regenerative braking in the vehicle. This subroutine will be described in more detail with reference to FIG. 7. The program next derives the rear brake torque and outputs <204> a signal thereof to activate electric rear brakes 48 and 50. These brakes are activated with reference to the total braking torque applied to the front wheels, so as to maintain vehicle stability in braking as known in the prior art.

The program next derives the commanded FRONT BRAKE TORQUE <206> in response to pressure signals from pressure sensors 88 and 90. These signals represent the braking command from the vehicle operator, as input to the braking system through the depression of brake pedal 70. When brake pedal 70 is depressed, pressure is generated in master cylinder 78 and switch 72 is activated. If the brake system is working normally, the signal from switch 72 causes brake control 66 to close solenoid valves 102 and 104. This essentially removes the brake system from a manual backup mode, wherein the brake fluid pressure itself activates the brakes, to an electronically controlled braking system, in which the brake fluid pressure in master cylinder 78 is cut off from brake actuators 114 and 116 but provides a commanded brake pressure signal to brake control 66 through pressure sensors 88 and 90. The FRONT BRAKE TORQUE signal is derived from these pressure signals, either by mathematical calculation or by a table lookup. Sensors 88 and 90 are continually monitored when no brake pedal is applied for mutual calibration purposes The use of two such sensors provides redundancy: if one fails the other still provides a signal. If both fail, the system senses the fact, opens valves 102 and 104, and falls back to manual fluid pressure brake control.

Next, brake control determines how much regenerative braking (blend) to request from motor control 22 in subroutine DETERMINE REQUEST BLEND REGEN <208>. This subroutine is described in detail below with reference to the flow chart of FIG. 8. When the REQUEST BLEND REGEN torque is determined, a signal thereof is sent to motor control 22 <208>over dedicated PWM communication line 60. Motor control 22 derives and returns the ACHIEVED BLEND REGEN as previously described; and brake control 66 receives the ACHIEVED BLEND REGEN torque signal <212> over dedicated PWM communication line 62 and calculates <214> the FRONT FRICTION BRAKE TORQUE as the FRONT BRAKE TORQUE, determined in task 206, minus the ACHIEVED BLEND REGEN torque received from motor control 22. This may be better understood with reference to the graph of FIG. 9. This graph depicts three brake torques over time during a typical brake pedal application. Curve 130 describes the requested total brake torque, which is to be made up of regenerative torque to the degree possible, represented by curve 133, and friction brake torque, represented by curve 136. Thus, the system must calculate, at any time, the friction brake torque required, when added to the regenerative torque achieved, to produce the total requested brake torque. It can be seen that there is a delay in the achievement of regenerative torque, so that the initial braking is almost all by the friction brake system. When regenerative braking is finally achieved, it quickly goes to its achieved level, which results in a temporary significant reduction in friction brake torque. When the achieved regenerative torque reaches its achieved level and flattens out, there is an additional increase in friction brake torque before it levels out also. At any time, however, the sum of the values of curves 133 and 136 should equal the value of curve 130. In the event of anti-lock brake activity, this system will ramp down the regenerative blended brake torque, as shown with respect to curve 133 starting with the ABS event indicated. As this ramp down occurs, of course, the friction brakes, which will be under the control of the anti-lock brake system, will make up the difference in total brake torque, as shown. Returning to the flow chart of FIG. 5, the FRONT BRAKE FRICTION TORQUE signal is finally output to actuators 114 and 116 to apply friction braking to front wheels 24 and 26.

Figure 10:
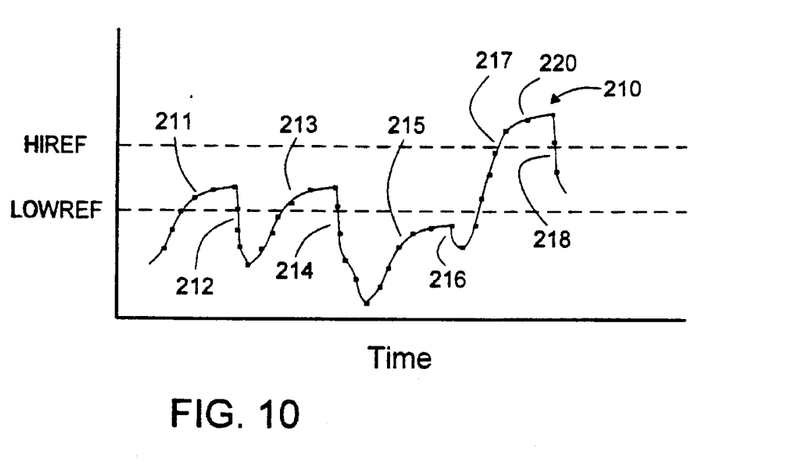

Subroutine DETERMINE SURFACE μ is described with reference to the flow chart of FIG. 6 and the graph of FIG. 10. This subroutine determines the friction (μ) of the surface on which the front wheels are operating by examining the modulated pressure from pressure sensors 106 and 108 during ABS activity. FIG. 10 comprises a graph of brake pressure versus time during anti-lock braking activity. The brake pressure, represented by curve 210, is modulated as it is allowed to increase gradually, seen in portion 211 of curve 210, until excess wheel slip is sensed and is then quickly released, seen in portion 212 of curve 210, to allow the wheel to be spun up again by the road into a rolling condition. Although the brake pressure is being repeatedly modulated in this fashion, the overall pressure level varies with the frictional characteristics of the road surface. When the road surface friction (μ) is low, the modulation is performed at a low level, as seen in the third modulation pulse 215, 216. A medium μ surface will provide a higher level, as in the first modulation pulse 211, 212. A high μ surface will provide a higher level of the modulated signal, as shown in the fourth modulation pulse 217, 218. By establishing two pressure levels, HIREF and LOWREF, and monitoring the modulated pressure with reference to these levels, subroutine DETERMINE SURFACE μ classifies the road surface encountered by the front wheels as low, medium or high μ.

Figure 6:
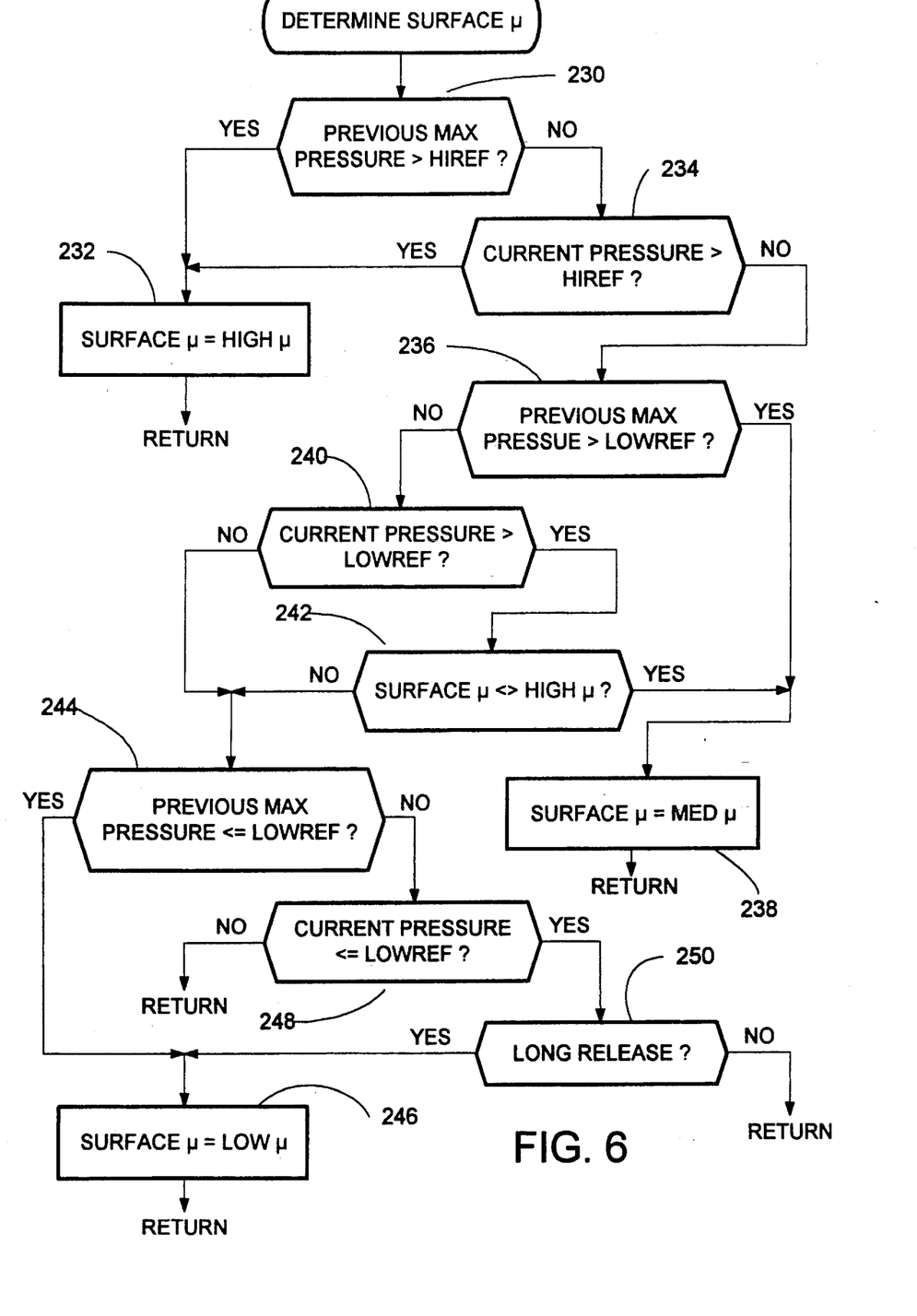
FIGS. 6, 7 and 8 are flow charts of subroutines called by the brake control of FIG. 5.

Referring to FIG. 6, the PREVIOUS MAX PRESSURE is compared with level HIREF <230>. The PREVIOUS MAX PRESSURE is the maximum pressure of the previous modulation pulse, which occurs at the point where braking pressure is released: e.g. the peak at the right end of rising pressure curve 217 in the fourth modulation pulse of FIG. 10. If the PREVIOUS MAX PRESSURE exceeds level HIREF, as it does the maximum pressure of rising pressure curve 217, the surface μ is declared <232> as HIGH μ and the subroutine is exited. However, the system does not have to wait for a maximum pressure to find a HIGH μ. If the answer at task 230 is NO, the subroutine determines if the CURRENT PRESSURE exceeds HIREF <234>. Curve 210 shows dots along its length; and each dot represents a point at which a CURRENT PRESSURE is sensed by brake control 66. For example, dot 220 represents a CURRENT PRESSURE which exceeds level HIREF; and this pressure reading will produce a YES answer at task 234 and send the subroutine to task 232 to declare the SURFACE μ at this point as a HIGH μ surface, even though the PREVIOUS MAX PRESSURE is actually below level LOWREF.

If no HIGH μ surface is found, the PREVIOUS MAX PRESSURE is compared with level LOWREF <236>. If it is greater, a MEDIUM μ surface is declared <238> and the subroutine is exited. If not, however, the CURRENT PRESSURE is also compared with LOWREF <240>. If it is greater and the SURFACE μ was not declared HIGH μ <242> in the last program loop, a MEDIUM μ surface is declared <238>. If the CURRENT PRESSURE does not exceed level LOWREF <240>, or it does but the last SURFACE μ was HIGH μ <242>, the subroutine proceeds to determine if the PREVIOUS MAX PRESSURE is less than or equal to level LOWREF <244>. It should be understood that the last value of SURFACE μ is that determined on the last loop of the subroutine. If so, a LOW μ surface is declared <246>; and the subroutine is exited. If not, the subroutine determines if the CURRENT PRESSURE is less than or equal to level LOWREF. If it is not, the subroutine is exited; but, if it is, the subroutine determines if the wheel is in a long release. This would be the case if a sufficiently long time had elapsed with no increase in pressure. If a long release state is sensed <250>, a LOW μ surface is declared; but if not, the subroutine is exited.

Figure 7:
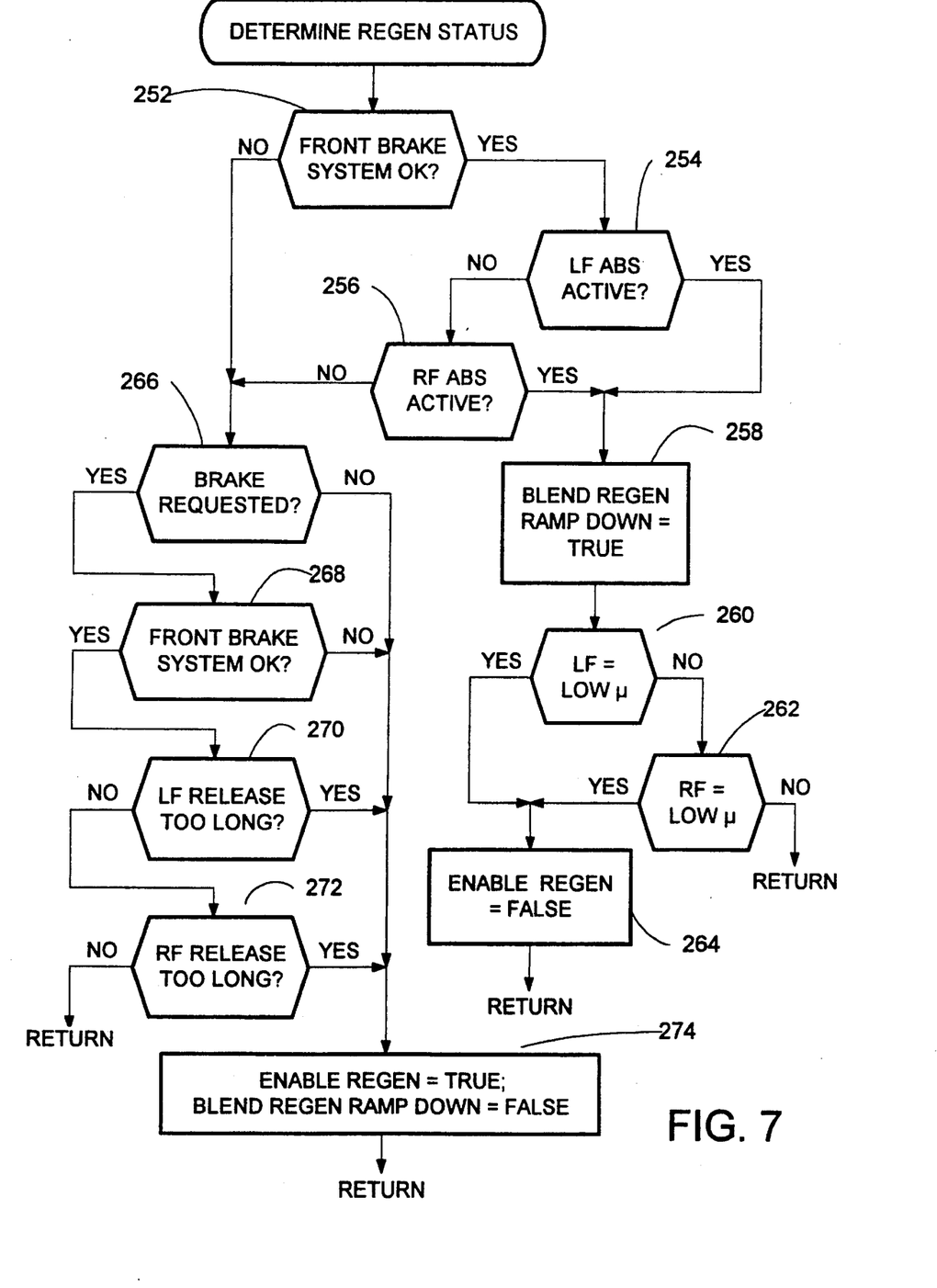

Subroutine DETERMINE REGEN STATUS, which controls the enable regen and blend regen ramp down status flags, is described with reference to FIG. 7. First, one or more diagnostic flags are checked to see if the front brake system is operating correctly <252>. If the answer is yes, the left front (LF) and right front (RF) ABS activity flags are checked to see if either LF ABS <254> or RF ABS <256> is active. If at least one is active, the blend regen ramp down status flag is set true <258>. If the front brake system is not operating correctly <252>, or if neither the LF <254> or RF <256> ABS is active, this flag is not set as described above; and the subroutine proceeds to task 266, to be described below. However, if the blend regen ramp down status flag is set true <258>, the LF and RF SURFACE μ a flags are checked next to see if either of the LF <260> or RF <262> wheels is on a low μ a surface. If at least one of the wheels is on a low μ surface, the enable regen flag is set false <264> before the subroutine exits. In this embodiment, all regenerative braking is disabled at task 264. Since it takes some time for the SURFACE μ a to be determined, the BLEND REGEN torque is generally ramped out by this time. If it is not, it is set to zero anyway, as vehicle stopping ability and stability takes precedence over braking smoothness.

Task <266> is reached if the front brake system is not operating correctly <252>, or if neither the LF <254> or RF <256> ABS is active. A brake requested flag is checked <266> to see if brake pedal 70 is depressed. This flag is set either by brake pedal switch 72 or by a sufficient pressure signal from pressure sensors 88 or 90. If not, the subroutine sets the enable regen status flag true and the blend regen ramp down status flag false <274> and exits. If so, the FRONT BRAKE SYSTEM OK flag <268> is checked again. If the front bake system is not operating correctly, the subroutine sets the enable regen status flag true and the blend regen ramp down status flag false <274> and exits. If they are operating correctly, the subroutine checks to see if either of the LF <270> or RF <272> brakes has been in release too long. Not shown in this description is the fact that the anti-lock brake system will end anti-lock brake activity if either of the front brakes has been in release too long, which will allow the subroutine to reach this point. If neither brake has been in release too long, the subroutine is exited; however, if at least one has, the subroutine sets the enable regen status flag true and the blend regen ramp down status flag false <274> before the subroutine is exited.

Figure 8:
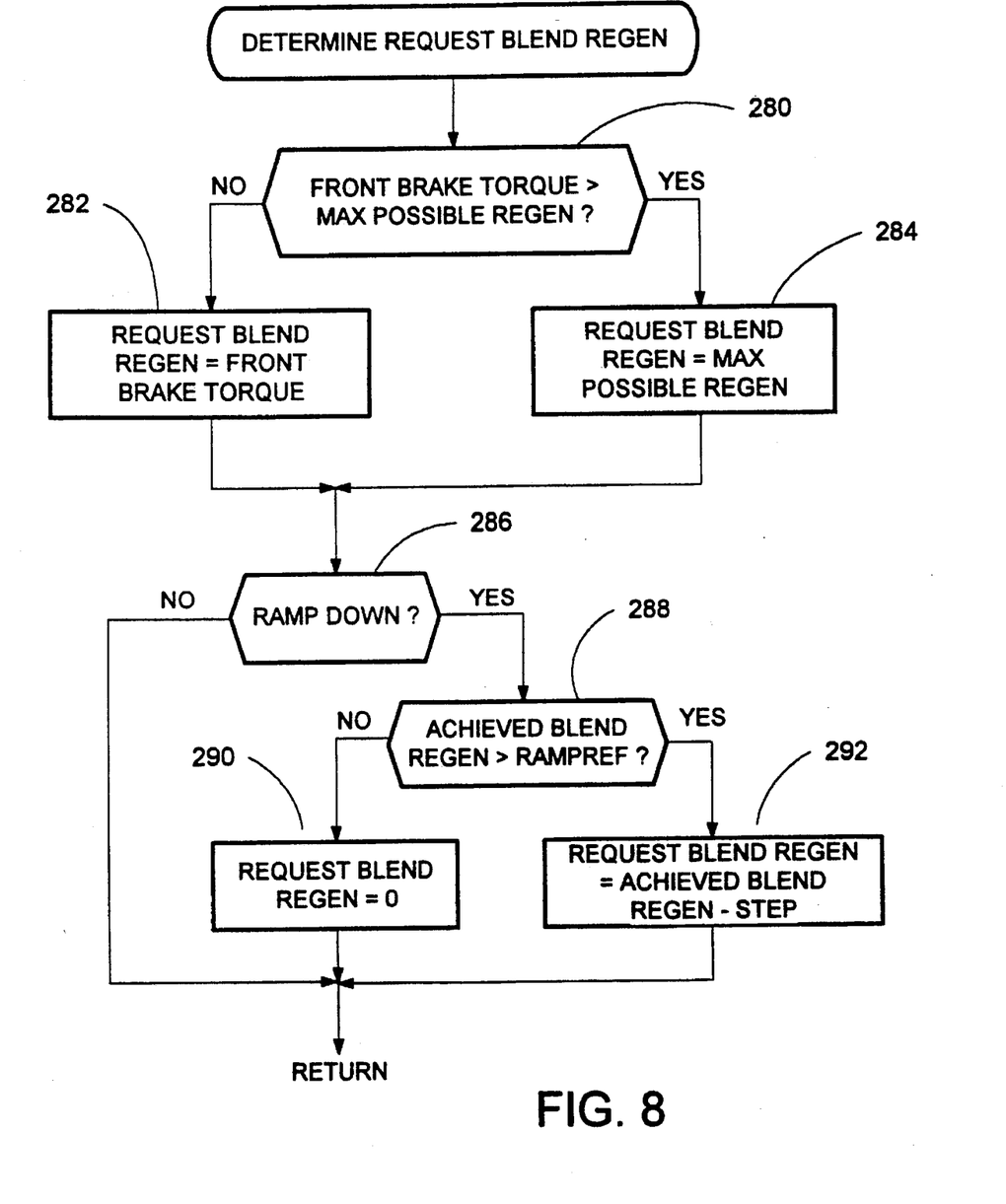
Figure 9:
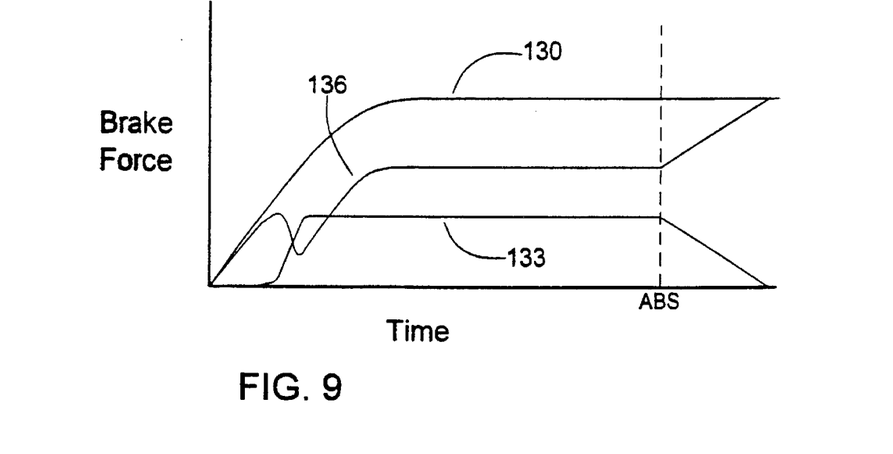
FIGS. 9, 10 and 11 are graphs illustrating aspects of the operation of the electric vehicle of FIG. 1.

Subroutine DETERMINE REQUEST BLEND REGEN is shown in the flow chart of FIG. 8. In this subroutine, brake control 66 determines how much regenerative braking to request from motor control 22. Since it is known that there is a maximum regenerative braking torque beyond which motor control 22 will never produce regenerative braking, there is no point in asking for more. Therefore, the FRONT BRAKE TORQUE is compared with a constant reference MAX POSSIBLE REGEN <280>. If it does not exceed this reference, REQUEST BLEND REGEN equals the FRONT BRAKE TORQUE <282> for maximum battery charge conservation. If it does exceed the reference, REQUEST BLEND REGEN is set equal to the reference MAX POSSIBLE REGEN <284>. Next, the subroutine checks the blend regen ramp down status flag <286> to see if BLEND REGEN is in a ramp down mode. Since regenerative braking, as applied to motor and drive unit 18, is much slower in response than the 3–10 Hz modulation rate of the ABS system, it is not useful in anti-lock brake control and is ramped down to zero, in the following manner. If the blend regen ramp down status flag is false <286>, the subroutine is exited. If the blend regen ramp down status flag is true <286>, however, the subroutine compares the value of ACHIEVED BLEND REGEN <288> with a reference value RAMPREF. If it is less, the remaining BLEND REGEN can be eliminated in one final step; and REQUEST BLEND REGEN is set equal to zero before the subroutine is exited. If it is still greater than or equal to RAMPREF, however, it is reduced by a constant value STEP before the subroutine is exited.

I claim:

1. A vehicle having an electric power supply, a front wheel, an electric propulsion motor mechanically coupled to the front wheel and electrically coupled to the electric power supply, a control for applying coastdown regenerative braking to the front wheel when the vehicle is in a coastdown mode, and a hydraulically activated friction brake system with an anti-lock apparatus which, when activated, responds to excess wheel slip of the front wheel during braking to modulate hydraulic pressure and thus control braking torque to reduce the excess wheel slip, the control comprising, in combination:

hydraulic pressure responsive means for determining when the front wheel is on a low friction road surface; and means for eliminating the coastdown regenerative braking when the anti-lock apparatus is active and the hydraulic pressure responsive means determines that the front wheel is on a low friction road surface but maintaining the coastdown regenerative braking when the anti-lock apparatus is active and the hydraulic pressure responsive means determines that the front wheel is not on a low friction road surface.

2. The vehicle of claim 1 in which the control further comprises means for applying blend regenerative braking and friction braking in response to an operator initiated brake signal to maximize the return of energy to the electric power supply and means for ramping down the blend regenerative braking to zero when the anti-lock apparatus is active.

3. In an electric vehicle comprising a front wheel, an electric propulsion motor having a rotor coupled to the front wheel for rotation therewith, an electric power source, an inverter electrically connecting the electric propulsion motor and electric power source for motoring or regenerative braking operation, a friction braking system for the front wheel, and an anti-lock braking control for the friction braking system, a control comprising, in combination:

means for deriving a total motor torque signal from a requested accel torque signal and a coastdown regen decel torque signal;

means for, if the total motor torque signal represents a net decel torque, determining from the total motor torque signal an achieved blend regen decel torque signal and outputting the achieved blend regen decel torque signal to the inverter for regenerative braking operation;

means for determining if the front wheel is on a low friction road surface; and means for, when the anti-lock braking control is active and the front wheel is on a low friction road surface, changing the coastdown regen decel torque signal to zero but, when the anti-lock control is active and the front wheel is not on a low friction surface, maintaining the coastdown regen decel torque signal.

4. The electric vehicle of claim 3 in which the friction brake system is a hydraulic brake system, the anti-lock brake control modulates a hydraulic pressure when activated and the means for determining if the front wheel is on a low friction road surface comprises sensing apparatus responsive to the hydraulic pressure.

5. The electric vehicle of claim 4 in which the anti-lock brake control modulates the hydraulic pressure between a first value for which wheel slip is detected and a second value for which wheel slip is not detected and the means for determining if the front wheel is on a low friction road surface repeatedly compares the first value as sensed by the sensing apparatus to a low pressure reference value.

6. The electric vehicle of claim 3 in which the coastdown regen decel torque signal has a value simulating the coastdown feel of an internal combustion engine with an automatic transmission.

7. The electric vehicle of claim 6 further comprising a cruise control for automatically maintaining a predetermined vehicle velocity in which the coastdown regen decel torque signal has a first value when the cruise control is not activated and a second, larger value when the cruise control is activated.

8. The electric vehicle of claim 3 in which the coastdown regen decel torque signal has a value simulating the coastdown feel of an internal combustion engine with an automatic transmission in DRIVE.

9. The electric vehicle of claim 3 in which the coastdown regen decel torque signal has a value simulating the coastdown feel of an internal combustion engine with an automatic transmission in OVERDRIVE.

10. In an electric vehicle comprising a front wheel, an electric propulsion motor having a rotor coupled to the front wheel for rotation therewith, an electric power source, an inverter electrically connecting the electric propulsion motor and electric power source for motoring or regenerative braking operation, a friction braking system for the front wheel, and an anti-lock braking control for the friction braking system, a control comprising, in combination:

means for deriving a total motor torque signal from a requested accel torque signal, a coastdown regen decel torque signal, and a requested regen decel torque signal;

means for determining, if the total motor torque signal represents a net decel torque, an achieved blend regen decel torque signal and outputting the latter to the inverter for regenerative braking operation;

means for determining a friction brake decel torque signal and outputting the latter to the friction brake system for friction braking;

means for determining if there is a low friction road surface in contact with the front wheel;

means for, when the anti-lock braking control is active and there is not a low friction road surface in contact with the front wheel, ramping down the requested regen decel torque signal to zero but maintaining the coastdown regen torque signal; and means for, when the anti-lock braking control is active and there is a low friction road surface in contact with the front wheel, changing the requested regen decel torque signal and the coastdown regen decel torque signal to zero immediately.

11. The electric vehicle of claim 10 in which the friction brake system is a hydraulic brake system, the anti-lock brake control modulates a hydraulic pressure when activated and the means for determining if the front wheel is on a low friction road surface comprises sensing apparatus responsive to the hydraulic pressure.

12. The electric vehicle of claim 11 in which the anti-lock brake control modulates the hydraulic pressure between a first value for which wheel slip is detected and a second value for which wheel slip is not detected and the means for determining if the front wheel is on a low friction road surface repeatedly compares the first value as sensed by the sensing apparatus to a low pressure reference value.

13. The electric vehicle of claim 10 in which the coastdown regen decel torque signal has a value simulating the coastdown feel of an internal combustion engine with an automatic transmission.

14. The electric vehicle of claim 13 further comprising a cruise control for automatically maintaining a predetermined vehicle velocity in which the coastdown regen decel torque signal has a first value when the cruise control is not activated and a second, larger value when the cruise control is activated.

15. The electric vehicle of claim 10 in which the coastdown regen decel torque signal has a value simulating the coastdown feel of an internal combustion engine with an automatic transmission in DRIVE.

16. The electric vehicle of claim 10 in which the coastdown regen decel torque signal has a value simulating the coastdown feel of an internal combustion engine with an automatic transmission in OVERDRIVE.

* * * * *